(12) United States Patent
Shao et al.

(10) Patent No.: US 12,025,842 B2
(45) Date of Patent: Jul. 2, 2024

(54) OPTICAL MODULE

(71) Applicant: HISENSE BROADBAND MULTIMEDIA TECHNOLOGIES CO., LTD., Qingdao (CN)

(72) Inventors: Qian Shao, Qingdao (CN); Jihong Han, Qingdao (CN); Tao Wu, Qingdao (CN); Jianwei Mu, Qingdao (CN); Honghao Jiao, Qingdao (CN)

(73) Assignee: HISENSE BROADBAND MULTIMEDIA TECHNOLOGIES CO., LTD, Qingdao (CN)

( * ) Notice: Subject to any disclaimer, the term of this patent is extended or adjusted under 35 U.S.C. 154(b) by 288 days.

(21) Appl. No.: 17/583,127

(22) Filed: Jan. 24, 2022

(65) Prior Publication Data

US 2022/0146763 A1      May 12, 2022

Related U.S. Application Data

(63) Continuation of application No. PCT/CN2021/080969, filed on Mar. 16, 2021.

(30) Foreign Application Priority Data

Jun. 3, 2020   (CN) .......................... 202010496671.7

(51) Int. Cl.
   *G02B 6/42*   (2006.01)
(52) U.S. Cl.
   CPC ........... *G02B 6/428* (2013.01); *G02B 6/4202* (2013.01)
(58) Field of Classification Search
   CPC .................................. G02B 6/42; G02B 6/43
   See application file for complete search history.

(56) References Cited

U.S. PATENT DOCUMENTS

| 5,212,754 A | 5/1993 | Basavanhally et al. |
| 6,055,102 A | 4/2000 | Park |

(Continued)

FOREIGN PATENT DOCUMENTS

| CN | 1220739 A | 6/1999 |
| CN | 102393575 A | 3/2012 |

(Continued)

OTHER PUBLICATIONS

International Search Report issued for PCT/CN2021/080969 Jun. 17, 2021, 9 pages.

(Continued)

*Primary Examiner* — Michael Stahl
(74) *Attorney, Agent, or Firm* — REISING ETHINGTON P.C.

(57) ABSTRACT

An optical module includes: a circuit board with a recess; a laser box disposed in the recess and electrically connected to the circuit board; a fiber ribbon, wherein one end of the fiber ribbon is connected to the laser box; and a silicon photonic chip electrically connected to the circuit board and to the other end of the fiber ribbon. The laser box includes: a flat base disposed in the recess, with one end of the flat base being coupled to the fiber ribbon; a conductive substrate disposed at the other end of the flat base and electrically connected to the circuit board; a laser chip attached on the conductive substrate; and an upper cover including a top plate and side plates, so that the upper cover caps/is covered on the flat base. A fitting between the flat base and the upper cover facilitates assembly of the conductive substrate and the laser chip in the laser box.

10 Claims, 8 Drawing Sheets

(56) References Cited

U.S. PATENT DOCUMENTS

| | | | |
|---|---|---|---|
| 10,788,690 | B2 | 9/2020 | Lin et al. |
| 10,791,620 | B2 | 9/2020 | Chen et al. |
| 2001/0012767 | A1 | 8/2001 | Kim |
| 2004/0238829 | A1 | 12/2004 | Kurita et al. |
| 2011/0049334 | A1* | 3/2011 | Nasu .................... G02B 6/4279 250/208.2 |
| 2011/0280267 | A1 | 11/2011 | Yoshikawa et al. |
| 2014/0218715 | A1 | 8/2014 | Li |
| 2014/0341515 | A1* | 11/2014 | Cole .................... G02B 6/4284 385/89 |
| 2017/0269316 | A1* | 9/2017 | Chang .................... H01L 24/81 |
| 2019/0041576 | A1* | 2/2019 | Byrd .................... G02B 6/12004 |
| 2020/0295528 | A1* | 9/2020 | Du .................... H01S 5/02325 |
| 2021/0239922 | A1* | 8/2021 | Du .................... H04B 10/503 |

FOREIGN PATENT DOCUMENTS

| | | |
|---|---|---|
| CN | 105629401 A | 6/2016 |
| CN | 206804919 U | 12/2017 |
| CN | 207318783 U | 5/2018 |
| CN | 108390256 A | 8/2018 |
| CN | 109407231 A | 3/2019 |
| CN | 109669248 A | 4/2019 |
| CN | 110208916 A | 9/2019 |
| CN | 110388576 A | 10/2019 |
| CN | 110401101 A | 11/2019 |
| CN | 110690644 A | 1/2020 |
| CN | 110730599 A | 1/2020 |
| CN | 110764202 A | 2/2020 |
| CN | 110830119 A | 2/2020 |
| CN | 110927881 A | 3/2020 |
| CN | 110989099 A | 4/2020 |
| CN | 111221085 A | 6/2020 |
| JP | H1022575 A | 1/1998 |
| JP | 2003329973 A | 11/2003 |

OTHER PUBLICATIONS

First Office Action issued by the National Intellectual Property Administration Of People's Republic Of China for application 202010496671.1 on Mar. 29, 2022.

English Translation of the first office action issued by the National Intellectual Property Administration Of People's Republic Of China for application 202010496671.1 on Mar. 29, 2022.

Second Office Action issued by the National Intellectual Property Administration Of People's Republic Of China for application 202010496671.1 on Sep. 5, 2022.

English Translation of the Second Office Action issued by the National Intellectual Property Administration Of People's Republic Of China for application 202010496671.1 on Sep. 5, 2022.

Notification on grant of patent right for invention issued by the National Intellectual Property Administration Of People's Republic Of China for application 202010496671.7 on Jan. 4, 2023.

English Translation of the Notification on grant of patent right for invention issued by the National Intellectual Property Administration Of People's Republic Of China for application 202010496671.1 on Jan. 4, 2023.

* cited by examiner

OPTICAL MODULE

The present disclosure claims the priority of Chinese patent application No. CN 202010496671.7, filed with the China National Intellectual Property Administration on Jun. 3, 2020 and entitled "OPTICAL MODULE", which is incorporated herein by reference in its entirety.

FIELD

The present disclosure relates to the technical field of optical communications, and in particular, to an optical module.

BACKGROUND

Optical communication technologies may be applied in novel services and applications such as cloud computing, mobile Internet, and videos. Moreover, in optical communication, an optical module is a device for realizing mutual conversion between an optical signal and an electrical signal, and is one of key components in an optical communication apparatus. At present, it has become a main solution for high-speed optical module in which an optical-to-electrical conversion function is implemented by using a silicon photonic chip.

In a silicon photonic optical module, a silicon photonic chip is disposed on a circuit board, and is electrically connected to the circuit board by using a bonding wire. The silicon photonic chip is connected to an optical interface of the optical module by using a fiber ribbon, so that an optical signal can enter or exit the silicon photonic chip. However, because the silicon material used by the silicon photonic chip is not an ideal light-emitting material for a laser chip and a light-emitting unit cannot be integrated in a process of manufacturing the silicon photonic chip, the silicon photonic chip should be provided with an external light source for providing light.

SUMMARY

An optical module provided according to the present disclosure may include: a circuit board provided with a recess; a laser box disposed in the recess and electrically connected to the circuit board, for emitting light without carrying a signal; a fiber ribbon, wherein one end of the fiber ribbon is connected to the laser box for transmitting the light without carrying a signal; and a silicon photonic chip electrically connected to the circuit board and to the other end of the fiber ribbon, for receiving the light without carrying a signal transmitted by the fiber ribbon, wherein the laser box includes: a flat base disposed in the recess, with one end of the flat base being coupled to the fiber ribbon; a conductive substrate disposed at the other end of the flat base and electrically connected to the circuit board; a laser chip attached on the conductive substrate and electrically connected to the conductive substrate; and an upper cover including a top plate and side plates connected to the top plate, with bottom portions of the side plates being connected to the flat base so that the upper cover caps the flat base.

DRAWINGS

To more clearly describe the technical solutions of the present disclosure, the accompanying drawings that are to be used in the embodiments will be described briefly below. Other accompanying drawings may also be derived, without an inventive effort, by one of ordinary skill in the art from these accompanying drawings.

DETAILED DESCRIPTION

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to". In the description of the specification, the terms such as "one embodiment", "some embodiments", "exemplary embodiments", "example", "specific example" or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms "first" and "second" are used for descriptive purposes only, and are not to be construed as indicating or implying the relative importance or implicitly indicating the number of indicated technical features. Thus, features defined with "first" and "second" may explicitly or implicitly include one or more of the features. In the description of the embodiments of the present disclosure, the term "a/the plurality of" means two or more unless otherwise specified.

In the description of some embodiments, the term "coupled" and "connected" and their derivatives may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The use of the phrase "applicable to" or "configured to" herein means an open and inclusive language, which does not exclude devices that are applicable to or configured to perform additional tasks or steps.

As used herein, the term "about", "substantially" or "approximately" includes a stated value and an average value within an acceptable range of deviation of a particular value. The acceptable range of deviation is determined by a person of ordinary skill in the art, considering the measurement in question and errors associated with the measurement of a particular quantity (i.e., limitations of a measurement system).

In optical communication technology, an optical signal is used to carry information to be transmitted, and the optical signal carrying the information is transmitted to an information processing device such as a computer through an information transmission device such as an optical fiber or an optical waveguide, so as to achieve transmission of the information. Since light has a characteristic of passive transmission when being transmitted through the optical fiber or the optical waveguide, low-cost and low-loss information transmission may be achieved. In addition, a signal transmitted by the information transmission device such as the optical fiber or the optical waveguide is the optical signal, while a signal that may be recognized and processed by the information processing device such as the computer is an electrical signal. Therefore, in order to establish information connection between the information transmission device such as the optical fiber or the optical waveguide and the information processing device such as the computer, interconversion between the electrical signal and the optical signal needs to be achieved.

An optical module implements a function of the interconversion between the optical signal and the electrical signal in the field of optical fiber communication technology. The optical module includes an optical port and an electrical port. The optical module achieves optical communication with the information transmission device such as the optical fiber or the optical waveguide through the optical port. And the optical module achieves electrical connection with an optical network terminal (e.g., an optical modem) through the electrical port. The electrical connection is mainly to achieve power supply, transmission of an I2C signal, transmission of data information and grounding. The optical network terminal transmits the electrical signal to the information processing device such as the computer through a network cable or wireless fidelity (Wi-Fi).

Figure 1:
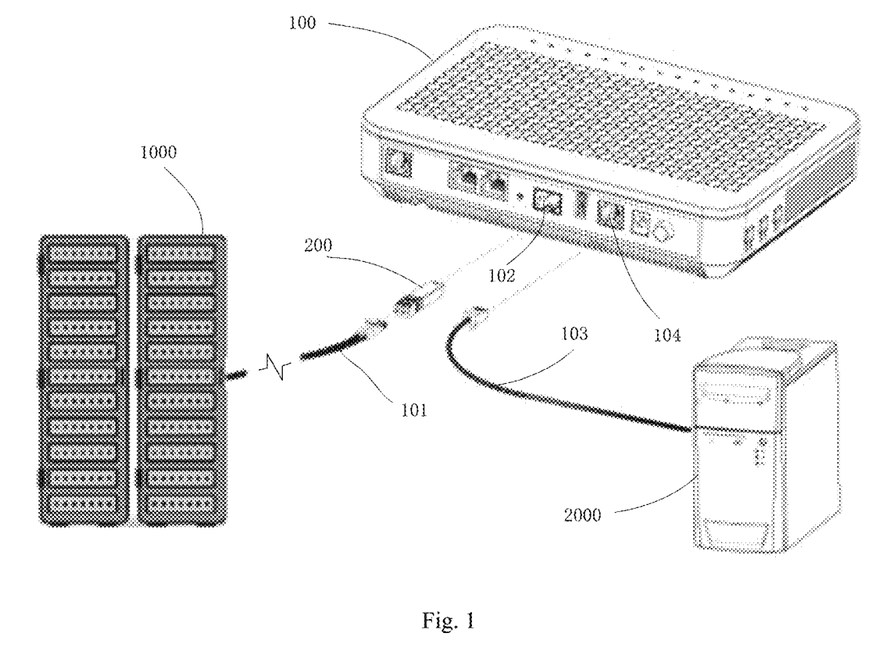
FIG. 1 is a schematic diagram illustrating a connection relationship of an optical communication terminal.

FIG. 1 is a connection relationship diagram of an optical communication system. As shown in FIG. 1, the optical communication system includes a remote server 1000, a local information processing device 2000, an optical network terminal 100, an optical module 200, an optical fiber 101 and a network cable 103.

One end of the optical fiber 101 is connected to the remote server 1000, and the other end thereof is connected to the optical network terminal 100 through the optical module 200. The optical fiber itself may support long-distance signal transmission, such as several-kilometer (6-kilometer to 8-kilometer) signal transmission. On this basis, infinite-distance transmission may be achieved theoretically if a repeater is used. Therefore, in a typical optical communication system, a distance between the remote server 1000 and the optical network terminal 100 may typically reach several kilometers, tens of kilometers, or hundreds of kilometers.

One end of the network cable 103 is connected to the local information processing device 2000, and the other end thereof is connected to the optical network terminal 100. The local information processing device 2000 is at least one of the followings: a router, a switch, a computer, a mobile phone, a tablet computer or a television.

A physical distance between the remote server 1000 and the optical network terminal 100 is typically greater than a physical distance between the local information processing device 2000 and the optical network terminal 100. Connection between the local information processing device 2000 and the remote server 1000 is completely by the optical fiber 101 and the network cable 103, and connection between the optical fiber 101 and the network cable 103 is completely by the optical module 200 and the optical network terminal 100.

The optical module 200 includes an optical port and an electrical port. The optical port is configured to access the optical fiber 101, so that a bidirectional optical signal connection is established between the optical module 200 and the optical fiber 101; and the electrical port is configured to access the optical network terminal 100, so that a bidirectional electrical signal connection is established between the optical module 200 and the optical network terminal 100. Interconversion between the optical signal and the electrical signal is achieved by the optical module 200, so that information connection between the optical fiber 101 and the optical network terminal 100 is established. For example, an optical signal from the optical fiber 101 is converted into an electrical signal by the optical module 200 and then the electrical signal is input into the optical network terminal 100, and an electrical signal from the optical network terminal 100 is converted into an optical signal by the optical module 200 and then the optical signal is input into the optical fiber 101. Since the optical module 200 is a tool for achieving the interconversion between the optical signal and the electrical signal, and has no function of processing data, the information does not change in the above photoelectric conversion process.

The optical network terminal 100 includes a housing in a substantially cuboid shape, and an optical module interface 102 and a network cable interface 104 that are disposed on the housing. The optical module interface 102 is configured to access the optical module 200, so that the bidirectional electrical signal connection between the optical network terminal 100 and the optical module 200 is established; and the network cable interface 104 is configured to access the network cable 103, so that a bidirectional electrical signal connection between the optical network terminal 100 and the network cable 103 is established. Connection between the optical module 200 and the network cable 103 is established through the optical network terminal 100. For example, the optical network terminal 100 transmits an electrical signal from the optical module 200 to the network cable 103, and transmits an electrical signal from the network cable 103 to the optical module 200. Therefore, the optical network terminal 100, as a master monitor of the optical module 200, may monitor operation of the optical module 200. In addition to the optical network terminal 100, the master monitor of the optical module 200 may further include an optical line terminal (OLT).

A bidirectional signal transmission channel between the remote server 1000 and the local information processing device 2000 has been established through the optical fiber 101, the optical module 200, the optical network terminal 100 and the network cable 103.

Figure 2:
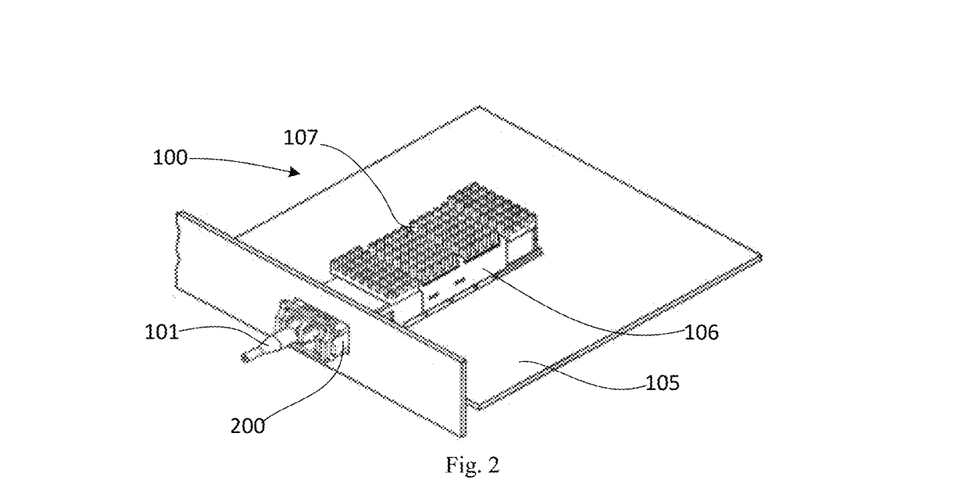
FIG. 2 is a schematic structural diagram illustrating an optical network unit.

FIG. 2 is a structural diagram of an optical network terminal. In order to clearly show a connection relationship between the optical module 200 and the optical network terminal 100, FIG. 2 only shows a structure of the optical network terminal 100 related to the optical module 200. As shown in FIG. 2, the optical network terminal 100 further includes a circuit board 105 disposed in the housing, a cage 106 disposed on a surface of the circuit board 105, a heat sink 107 disposed on the cage 106, and an electrical connector disposed inside the cage 106. The electrical connector is configured to access the electrical port of the optical module 200. The heat sink 107 has protruding portions such as fins for increasing a heat dissipation area.

The optical module 200 is inserted into the cage 106 of the optical network terminal 100, the optical module 200 is fixed by the cage 106, and heat generated by the optical module 200 is conducted to the cage 106 and is dissipated through the heat sink 107. After the optical module 200 is inserted into the cage 106, the electrical port of the optical module 200 is connected to the electrical connector inside the cage 106, so that the bidirectional electrical signal connection between the optical module 200 and the optical network terminal 100 is established. In addition, the optical port of the optical module is connected to the optical fiber 101, so that the bidirectional optical signal connection between the optical module 200 and the optical fiber 101 is established.

Figure 3:
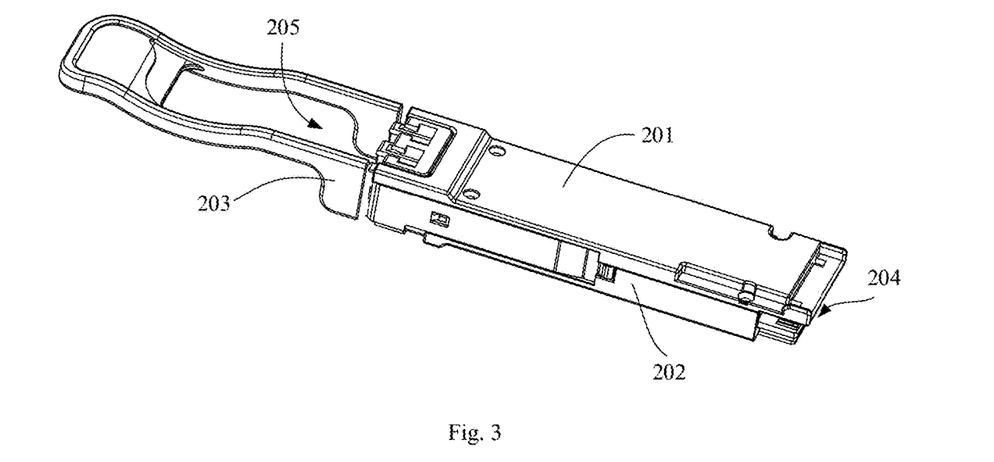
FIG. 3 is a schematic structural diagram illustrating an optical module according to an embodiment of the present disclosure.
Figure 4:
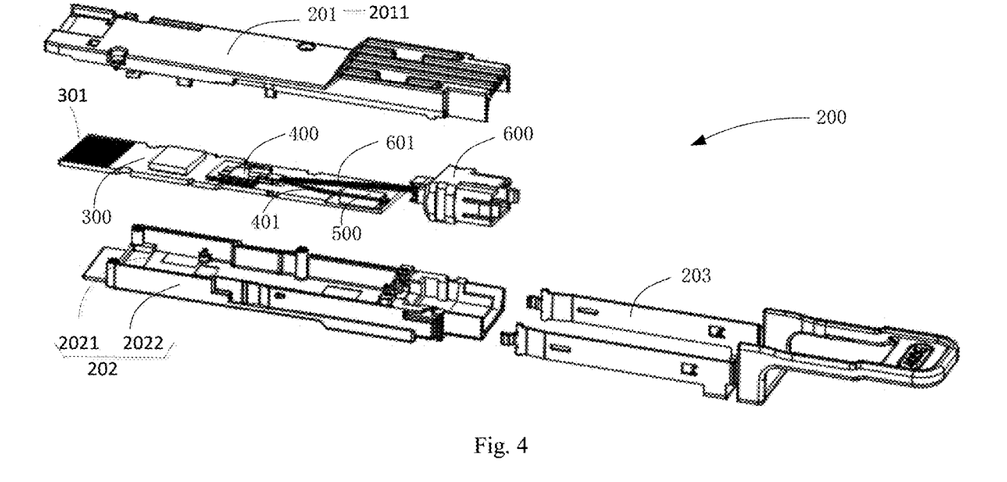
FIG. 4 is an exploded schematic structural diagram illustrating an optical module according to an embodiment of the present disclosure.

FIG. 3 is a structural diagram of an optical module in accordance with some embodiments, and FIG. 4 is an exploded view of an optical module in accordance with some embodiments. As shown in FIGS. 3 and 4, the optical module 200 includes a shell, a circuit board 300, a silicon photonic chip 400, a laser box 500 and a fiber socket 600 disposed in the shell.

The shell includes an upper shell 201 and a lower shell 202. The upper shell 201 covers the lower shell 202 to form the above shell with two openings, and an outer contour of the shell is generally in a cuboid shape.

In some embodiments of the present disclosure, the lower shell 202 includes a bottom plate 2021 and two lower side plates 2022 located on two sides of the bottom plate 2021 respectively and disposed perpendicular to the bottom plate 2021; the upper shell 201 includes a cover plate 2011, and the cover plate 2011 covers the two lower side plates 2022 of the lower shell 202 to form the above shell.

In some embodiments, the lower shell 202 includes a bottom plate and two lower side plates located on both sides of the bottom plate respectively and disposed perpendicular to the bottom plate; the upper shell 201 includes a cover plate and two upper side plates located on both sides of the cover plate respectively and disposed perpendicular to the cover plate; and the two upper side plates are combined with the two lower side plates respectively, so that the upper shell 201 covers the lower shell 202.

A direction in which a connecting line between the two openings 204 and 205 is located may be the same as a longitudinal direction of the optical module 200, or may not be the same as the longitudinal direction of the optical module 200. For example, the opening 204 is located at an end (a right end in FIG. 3) of the optical module 200, and the opening 205 is also located at an end (a left end in FIG. 3) of the optical module 200. Alternatively, the opening 205 may be located at an end of the optical module 200, and the opening 204 may be located on a side of the optical module 200. The opening 204 is the electrical port, and a connecting finger 301 extends from the electrical port 204 and inserts into the master monitor (e.g., the optical network terminal 100); the opening 205 is the optical port, and is configured to assess an external optical fiber 101, so that the optical fiber 101 is connected to the silicon photonic chip 400 inside the optical module 200.

By using an assembly mode of combining the upper shell 201 and the lower shell 202, it is possible to facilitate installation of devices such as the circuit board 300, the silicon photonic chip 400, and the fiber socket 600 into the shell, and the upper shell 201 and the lower shell 202 may form encapsulation protection for these devices. In addition, when devices such as the circuit board 300 and the silicon photonic chip 400 are assembled, it is possible to facilitate arrangement of positioning components, heat dissipation components and electromagnetic shielding components of these devices, which is conducive to implementation of automated production.

In some embodiments, the upper shell 201 and the lower shell 202 are generally made of a metal material, which facilitates electromagnetic shielding and heat dissipation.

In some embodiments, the optical module 200 further includes an unlocking component 203 located at an outside of the shell. The unlocking component 203 is configured to implement a fixed connection between the optical module 200 and the master monitor, or to release the fixed connection between the optical module 200 and the master monitor.

For example, the unlocking component 203 is located on outer walls of the two lower side plates 2022 of the lower shell 202, has an engagement component that is matched with the cage of the master monitor (e.g., the cage 106 of the optical network terminal 100). When the optical module 200 is inserted into the cage of the master monitor, the optical module 200 is fixed in the cage of the master monitor by the engagement component of the unlocking component 203. When the unlocking component 203 is pulled, the engagement component of the unlocking component 203 moves with the pulling, and then a connection relationship between the engagement component and the master monitor is changed to release engagement between the optical module 200 and the master monitor, so that the optical module 200 may be drawn out of the cage of the master monitor.

The circuit board 300 includes a circuit wiring, electronic elements and chips. Through the circuit wiring, the electronic elements and the chips are connected together according to a circuit design, so as to implement functions such as power supply, transmission of electrical signals and grounding. The electronic elements may include, for example, a capacitor, a resistor, a triode, and a metal-oxide-semiconductor field-effect transistor (MOSFET). The chips may include, for example, a microcontroller unit (MCU), a limiting amplifier, a clock and data recovery (CDR) chip, a power management chip or a digital signal processing (DSP) chip.

The circuit board 300 is generally a rigid circuit board, and the rigid circuit board may also implement a bearing function due to its relatively hard material. For example, the rigid circuit board may stably bear the electronic elements and the chips, and may also be inserted into the electrical connector in the cage of the master monitor.

The circuit board 300 further includes the connecting finger 301 formed on an end surface thereof, and the connecting finger 301 is composed of a plurality of independent pins. The circuit board 300 is inserted into the cage 106, and is conductively connected to the electrical connector in the cage 106 through the connecting finger 301. The connecting finger 301 may be disposed on only a surface (e.g., an upper surface shown in FIG. 4) of the circuit board 300, or may be disposed on both upper and lower surfaces of the circuit board to adapt to an occasion with a demand for a large number of pins. The connecting finger 301 is configured to establish an electrical connection with the master monitor to realize the power supply, the grounding, transmission of I2C signal, and the transmission of electrical signals.

Of course, flexible circuit boards are also used in some optical modules. As a supplement to the rigid circuit board, a flexible circuit board is generally used in conjunction with the rigid circuit board.

The silicon photonic chip 400 and the circuit board 300 are electrically connected, and specifically, may be connected via bonding wire, for example, may be connected via a semiconductor bonding gold wire (gold wire bonding). A periphery of the silicon photonic chip 400 is connected with the circuit board 300 by using a plurality of conductive wires. Therefore, the silicon photonic chip 400 is generally disposed on a surface of the circuit board 300.

The silicon photonic chip 400 receives light from the laser box 500, and further modulates the light. Specifically, a signal is modulated onto the light. The silicon photonic chip 400 receives light from the fiber socket 600, and further converts an optical signal into an electrical signal.

An optical connection between the silicon photonic chip 400 and the fiber socket 600 is achieved via a first fiber ribbon 601, and the fiber socket 600 is optically connected with an optical fiber external of the optical module. The fiber socket 600 includes an optical fiber splice. The light modulated by the silicon photonic chip 400 is transmitted to the optical fiber splice of the fiber socket 600 through the first fiber ribbon 601, and is transmitted to the external optical fiber connected to the fiber socket 600 via the optical fiber splice. The light transmitted from the external optical fiber is transmitted to the first fiber ribbon 601 via the fiber socket 600, and is transmitted to the silicon photonic chip 400 through the first fiber ribbon 601. In this way, the silicon photonic chip 400 outputs light carrying data to the external optical fiber of the optical module, or receives light carrying data from the external optical fiber of the optical module.

The laser box 500 is disposed on the circuit board 300, and establishes an optical connection with the silicon photonic chip 400 via a second fiber ribbon 401. Due to relatively good monochromaticity of a laser, the laser box 500 may use a laser source, and a main internal electrical device thereof is a laser chip that emits light without modulated signals. The laser box 500 is electrically connected to the circuit board 300, and the laser chip is electrically driven by the circuit board 300. An electrical temperature adjustment device such as a semiconductor cooler may be provided in the laser box 500 to achieve a temperature control of the laser chip, where the electrical temperature adjustment device is powered and driven by the circuit board 300. The first fiber ribbon 601 and the second fiber ribbon 401 respectively include a couple of optical fibers.

Figure 5:
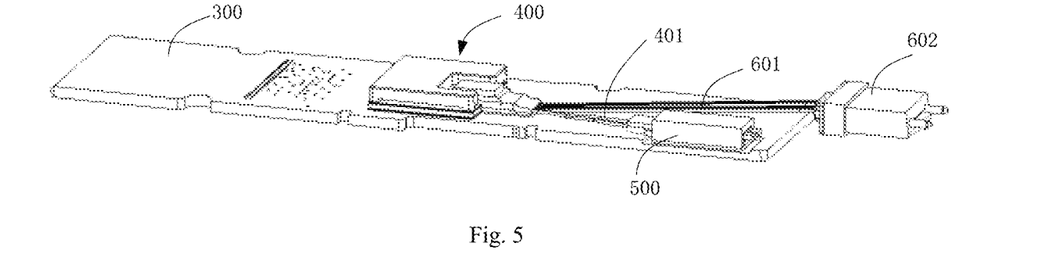
FIG. 5 is a first schematic structural diagram illustrating a silicon photonic chip and a laser box provided on a circuit board according to an embodiment of the present disclosure.
Figure 6:
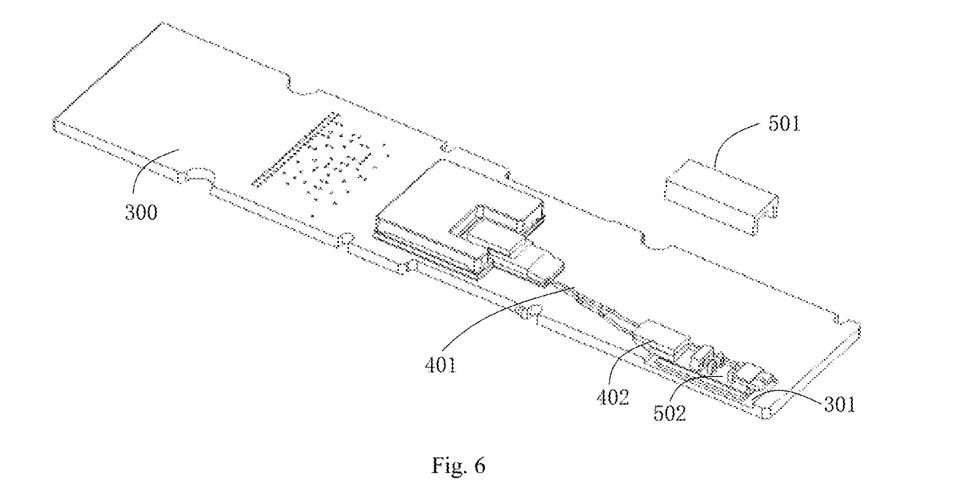
FIG. 6 is a second schematic structural diagram illustrating a silicon photonic chip and a laser box provided on a circuit board according to an embodiment of the present disclosure.
Figure 7:
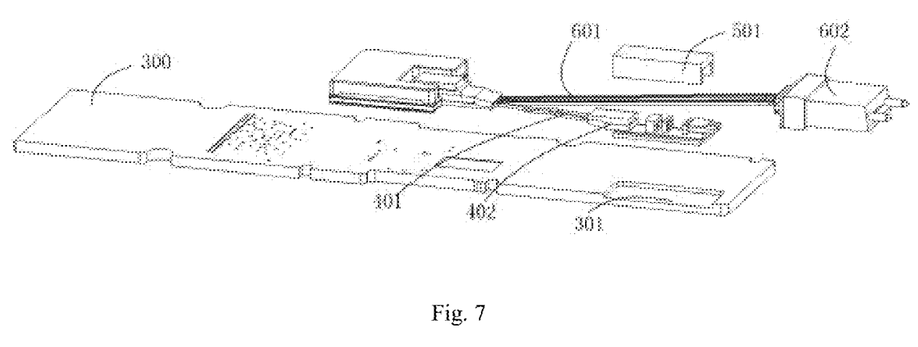
FIG. 7 is a third schematic structural diagram illustrating a silicon photonic chip and a laser box provided on a circuit board according to an embodiment of the present disclosure.

FIG. 5 is a first schematic structural diagram illustrating a silicon photonic chip and a laser box on a circuit board according to an embodiment of the present disclosure. FIG. 6 is a second schematic structural diagram illustrating a silicon photonic chip and a laser box on a circuit board according to an embodiment of the present disclosure. FIG. 7 is a third schematic structural diagram illustrating a silicon photonic chip and a laser box on a circuit board according to an embodiment of the present disclosure. As shown in FIG. 5 to FIG. 7, the silicon photonic chip 400 is disposed on the surface of the circuit board 300, a recess 301 is provided on the circuit board 300, and the laser box 500 is disposed in the recess 301.

In the embodiments of the present disclosure, the silicon photonic chip 400 may be directly disposed on the circuit board 300; or a circuit adapter board may be disposed between the silicon photonic chip 400 and the circuit board 300, and the silicon photonic chip 400 is mounted on the circuit board 300 via the circuit adapter board. The circuit adapter board is disposed on the circuit board 300 and is electrically connected to the circuit board 300, and then the silicon photonic chip 400 is disposed on the circuit adapter board and is electrically connected to the circuit adapter board, so that the silicon photonic chip is electrically connected to the circuit board 300. In addition, a driving chip (driver) and a transimpedance amplifier may also be disposed on the circuit adapter board, and are finally connected to the circuit board 300 via a signal coupling of the circuit adapter board.

A coefficient of thermal expansion of the circuit adapter board is lower than that of the circuit board 300, and the circuit adapter board may be made of, for example, a material such as aluminum nitride or aluminum oxide. Correspondingly, thermal deformation of the circuit adapter board is smaller than that of the circuit board 300, that is, thermal stability of the circuit adapter board is better than that of the circuit board 300. Therefore, during operation of the optical module, the circuit adapter board may provide a more stable surface for carrying the silicon photonic chip disposed thereon, thereby ensuring a positioning stability of the silicon photonic chip 400 with respect to the first fiber ribbon 601 and the second fiber ribbon 401. In this way, stability of optical coupling efficiency between the silicon photonic chip 400 and the fiber ribbons may be ensured. In addition, the circuit adapter board in the embodiments of the present disclosure is disposed to have two or more layers, and is provided with internal circuit tracings for realizing an electrical connection between the silicon photonic chip 400 and the circuit board 300, so that the silicon photonic chip 400 modulates an optical signal based on a modulation signal from the driving chip, and converts the optical signal from the outside into an electrical signal and then outputs the electrical signal to the circuit board 300.

Further, the silicon photonic chip 400 is usually connected to the circuit board 300 or the circuit adapter board via bonding wires. Gold wires with a small wire diameter are fragile, and are densely arranged with small distances therebetween, thus are prone to deformation, damage, or collapse during a packaging process or a product usage of the optical module. In this connection, a protection cover is usually disposed on the silicon photonic chip 400. The protection cover caps the circuit board 300, and a space is formed by the circuit board 300 and the protection cover capping the circuit board 300. The silicon photonic chip and a routine area of the bonding wires of the silicon photonic chip are packaged/enveloped in the space formed by the protection cover and the circuit board 300. It should be noted that the packaging/enveloping in the embodiments of the present disclosure refers to an assembly form that, in the space defined by the protection cover and the circuit board 300, the silicon photonic chip 400, the routine area of the bonding wires of the silicon photonic chip, and other optoelectronic devices are in clearance fit with the protection cover.

The laser box 500 includes an upper cover 501, a flat base 502, and a laser assembly. The laser assembly is disposed on the flat base 502, and the upper cover 501 caps the flat base 502 with a bottom portion fixedly connected with the flat base 502. In the embodiments of the present disclosure, the flat base 502 is of a relatively flat sheet-like structure, and the upper cover 501 is of a cover-like structure. The upper cover 501 caps the flat base 502, so that a space is formed by the upper cover 501 and the flat base 502; further, the upper cover 501 covers the laser assembly arranged within the space formed by the upper cover 501 and the flat base 502. To facilitate heat dissipation, both the upper cover 501 and the flat base 502 are made of metal materials, such as tungsten copper, Kovar alloy, and the like.

The laser assembly includes a laser chip, a conductive substrate, a lens assembly, and other components. The conductive substrate is disposed on the flat base 502, and the laser chip is disposed on the conductive substrate. The conductive substrate is electrically connected to the circuit board to supply power for the laser chip. The laser chip generates light without modulated signals, and the light is transmitted to the second fiber ribbon 401 through the lens assembly and other components, and then is transmitted to the silicon photonic chip via the second fiber ribbon 401.

In the embodiments of the present disclosure, the silicon photonic chip 400 is disposed on the circuit board 300 directly or is disposed on the circuit board 300 via the circuit adapter board. Therefore, there may be a certain height difference between an optic axis of light output from the laser box 500 and the silicon photonic chip 400. In this case, the second fiber ribbon 401 optically connected to the silicon photonic chip 400 needs to be first elevated/raised by an additional supporting member before being connected to the laser box 500.

Therefore, according to the embodiments of the present disclosure, to facilitate the optical connection between the laser box 500 and the silicon photonic chip 400, the recess 301 is provided on the circuit board 300, with the laser box 500 being disposed in the recess 301. Based on a height difference between a light emission port of the laser box 500 and an optical port of the silicon photonic chip 400, in the embodiments, a depth of the recess 301 is set to be 100-150 um, which is certainly not limited to this special range. According to the embodiments of the present disclosure, by provision of the recess 301, positioning of the laser box 500 may be further facilitated during an assembly process of the optical module, so as to facilitate arrangement of the laser box 500.

In an embodiment of the present disclosure, the recess 301 is provided at a position along a long side of the circuit board 300 and close to a corner, thus the laser box 500 is disposed at a position along the long side of the circuit board 300 and close to the corner. In this way, it may help to reduce influence of mounting of the laser box 500 on other devices on the circuit board 300.

As shown in FIG. 5 and FIG. 7, an optical fiber splice 602 is disposed at one end of the first fiber ribbon 601 provided in the embodiments of the present disclosure. The optical fiber splice 602 is configured to fix an end portion of an optical fiber in the first fiber ribbon 601, and is disposed in the fiber socket 600. When an external optical fiber is inserted into the fiber socket 600, the optical fiber in the first fiber ribbon 601 is connected to the external optical fiber via the optical fiber splice 602.

As shown in FIG. 6 and FIG. 7, to facilitate the connection between the second fiber ribbon 401 and the laser box 500, the second fiber ribbon 401 according to the embodiments of the present disclosure is further provided with a fiber interface 402. Optical fibers in the second fiber ribbon 401 are easy to bend and break, and therefore, an end portion of the optical fibers in the second fiber ribbon 401 is inserted into the fiber interface 402. The end portion of the optical fibers in the second fiber ribbon 401 may be fixed by using the fiber interface 402, thereby facilitating mounting and use of the second fiber ribbon 401.

The fiber interface 402 includes an upper substrate and a lower substrate. Optical fibers in the second fiber ribbon 401 are positioned between the upper substrate and the lower substrate, and are clamped by a structure formed between a surface of the upper substrate and a surface of the lower substrate. The structure formed between the surface of the upper substrate and the surface of the lower substrate may also seal the end portion of the optical fibers in the second fiber ribbon 401. Grooves are disposed on the surface of the lower substrate of the fiber interface, and the end portion of the optical fibers in the second fiber ribbon 401 are disposed in the grooves. The lower substrate and the optical fibers are respectively covered and pressed by the upper substrate. A commonly used groove structure is a V-shaped groove or a U-shaped groove. In the embodiments of the present disclosure, if the laser box outputs two light beams to the outside, two optical fibers are clamped in the fiber interface 402, and the second fiber ribbon 401 includes two optical fibers. The number of optical fibers clamped in the fiber interface 402 and the number of optical fibers in the second fiber ribbon 401 may be selected according to the number of light beams output by the laser box to the outside.

Further, in view of a layout of the circuit board and requirements on an application environment and the like of the optical module, laser boxes 500 with different structures are provided in the embodiments of the present disclosure.

Figure 8:
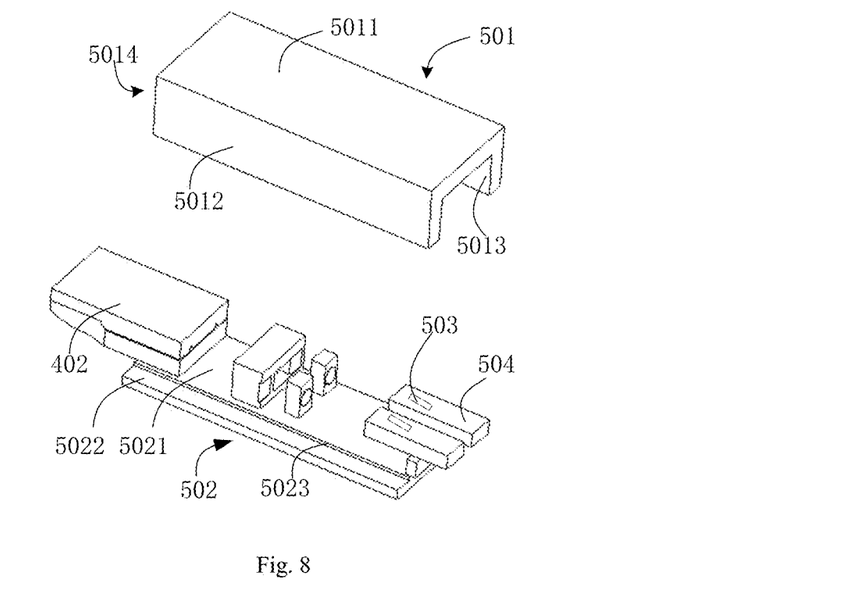
FIG. 8 is a first exploded structural diagram illustrating a first laser box according to an embodiment of the present disclosure.
Figure 9:
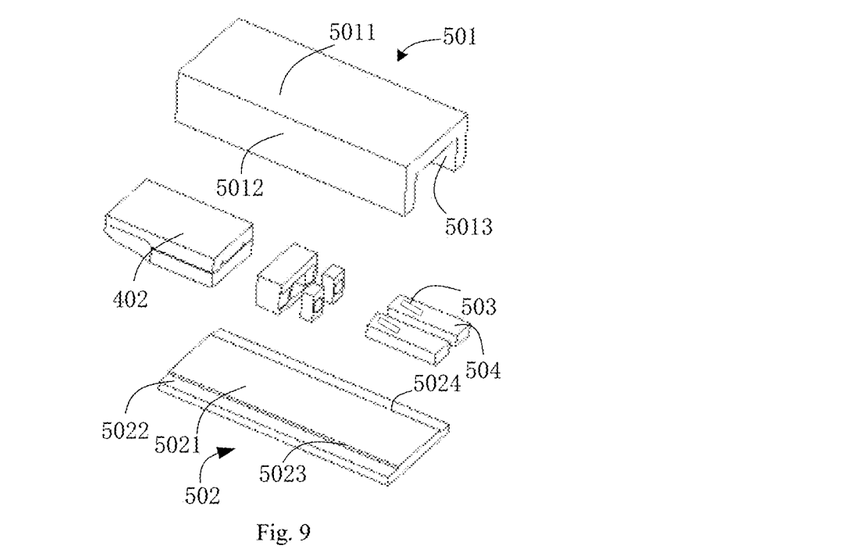
FIG. 9 is a second exploded structural diagram illustrating a first laser box according to an embodiment of the present disclosure.
Figure 10:
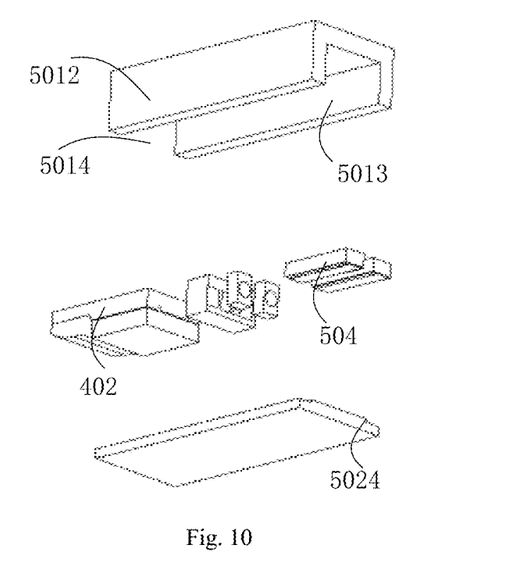
FIG. 10 is a third exploded structural diagram illustrating a first laser box according to an embodiment of the present disclosure.

FIG. 8 is a first exploded structural diagram illustrating a first laser box according to an embodiment of the present disclosure. FIG. 9 is a second exploded structural diagram illustrating a first laser box according to an embodiment of the present disclosure. FIG. 10 is a third exploded structural diagram illustrating a first laser box according to an embodiment of the present disclosure. As shown in FIG. 8 to FIG. 10, the laser box 500 includes an upper cover 501, a flat base 502 and a laser assembly.

The upper cover 501 includes a top plate 5011, a first side plate 5012, and a second side plate 5013. Top portions of the first side plate 5012 and the second side plate 5013 are respectively connected to two sides of the top plate 5011, and are respectively disposed along a length direction of the top plate 5011. The first side plate 5012 and the second side plate 5013 form a first notch 5014 at a left end of the upper cover 501. The first notch 5014 is used for fixedly disposing the fiber interface 402. Further, the first side plate 5012 and the second side plate 5013 may form a second notch at a right end of the upper cover 501, and the second notch is used for allowing a conductive substrate or a flexible board to pass through.

A top surface of the flat base 502 includes a first plane 5021 for mounting a laser assembly. The top surface of the flat base 502 further includes a second plane 5022. There is a height difference between the second plane 5022 and the first plane 5021, and thus a first step surface 5023 and a second step surface 5024 are formed on the top surface of the flat base 502.

The laser assembly is disposed on the first plane 5021 of the flat base 502, and the upper cover 501 caps/is covered on the flat base 502. A width between the inner surfaces of the first side plate 5012 and the second side plate 5013 matches with a width of the first plane 5021 on the flat base 502. When the upper cover 501 caps/is covered on the flat base 502, the first plane 5021 is located between the first side plate 5012 and the second side plate 5013. Bottom surfaces of the first side plate 5012 and the second side plate 5013 are in contact with the second plane 5022. The first step surface 5023 and the second step surface 5024 are used for limiting the first side plate 5012 and the second side plate 5013. When the upper cover 501 caps/is covered on the flat base 502, the inner surface of the first side plate 5012 is close to/against the first step surface 5023, and the inner surface of the second side plate 5013 is close to/against the second step surface 5024, so that bottom portions of the side plates 5012 and 5013 are respectively connected to the first and second step surfaces 5023 and 5024 to form a bayonet coupling.

In an embodiment of the present disclosure, the upper cover 501 and the flat base 502 are fixedly bonded by glue. For example, bottom portions of the first side plate 5012 and the second side plate 5013 are fixedly bonded on the second plane 5022 of the flat base 502 by using high thermally conductive silver adhesive.

The laser assembly includes a laser chip 503, a conductive substrate 504, and optical devices disposed on an optical path of the laser chip 503. The conductive substrate 504 is disposed on the flat base 502, the laser chip 503 is disposed on the conductive substrate 504, and the conductive substrate 504 is connected to the circuit board via bonding wires. The conductive substrate 504 may not only be connected to the circuit board 300 via bonding wires, but may also be connected to the circuit board 300 via a flexible board. The optical devices include lens, an isolator, and the like. The laser assembly may further include a semiconductor cooler and the like.

Specifically, as shown in FIG. 8 to FIG. 10, two laser chips 503 and two conductive substrates 504 are disposed in the laser box 500, and the optical devices may be autonomously selected as required. Generally, the two laser chips emit lights with the same wavelength. Each conductive substrate 504 is provided with a laser chip 503, so that the laser chip 503 and the conductive substrate 504 together with the optical devices form two light emitting paths. In each light emitting path, driving power from the circuit board 300 is supplied to the conductive substrate 504 via the flexible board, so that the conductive substrate 504 supplies power for the laser chip 503, and light is emitted by the laser chip 503. The light emitted by the laser chip 503 is converged by a lens. The two light emitting paths share an optical isolator. Certainly, it is possible to provide two optical isolators, each for one of the two light emitting paths respectively. Further, the two laser chips may also share a conductive substrate. In the embodiments of the present disclosure, the number of the laser chips 503 is not limited to two, and may also be one, three, four, or the like.

The conductive substrate 504 may be made of a metalized ceramic that supplies power for the laser chip, where a circuit pattern is formed on a surface of the metalized ceramic. Meanwhile, the metalized ceramic has a relatively good heat-conducting property, and may be used as a heat sink of the laser chip for heat dissipation. Laser has become a preferred light source for optical modules and specifically for fiber transmission due to relatively good single-wavelength characteristics and preferred wavelength tuning characteristics; other types of light, such as LED light, generally are not used in a common optical communication system. Although these types of light sources may be used in special optical communication systems, characteristics of the light sources and chip structures are quite different from that of the laser source. In this case, there would be relatively large technical difference between an optical module using laser and an optical module using other light source. A person skilled in the art generally will not expect that the two types of optical modules can provide technical teachings for each other.

In the embodiments of the present disclosure, heat generated by the laser chip 503 is first conducted to the flat base 502 through the conductive substrate 504, and then is transferred from the second plane 5022 of the flat base 502 to the first side plate 5012 and the second side plate 5013 of the upper cover 501, and finally is transferred to a housing of the optical module through a thermal conducting fin between the top plate of the upper cover 501 and the housing of the optical module.

Figure 11:
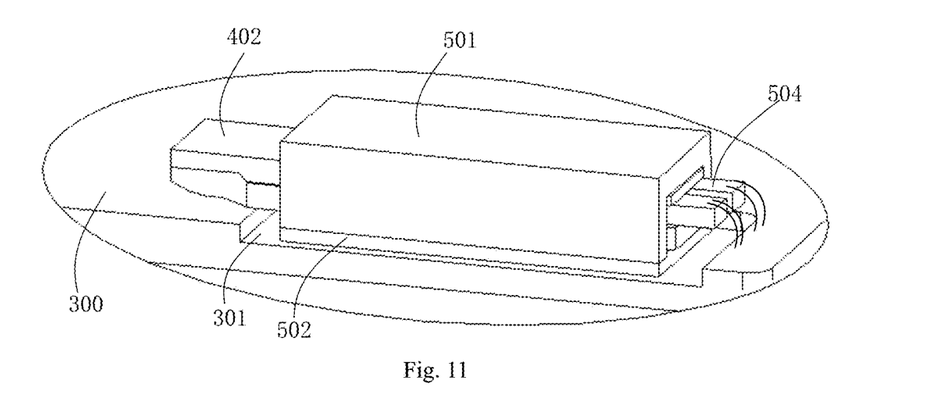
FIG. 11 is a schematic diagram illustrating fixing and assembly of a first laser box according to an embodiment of the present disclosure.

FIG. 11 is a schematic diagram illustrating fixing and assembly of a first laser box according to an embodiment of the present disclosure. As shown in FIG. 11 in conjunction with FIG. 8 to FIG. 10, the flat base 502 is disposed in the recess 301; a portion of the fiber interface 402 is located in the first notch 5014, and other portion extends out from the first notch 5014; a portion of the conductive substrate 504 extends out from the second notch, with said portion being connected to the circuit board 300 via bonding wires.

The conductive substrate 504 may also be entirely located in the cavity formed by the upper cover 501 and the flat base 502, and then be connected to the circuit board 300 via a flexible board.

Figure 12:
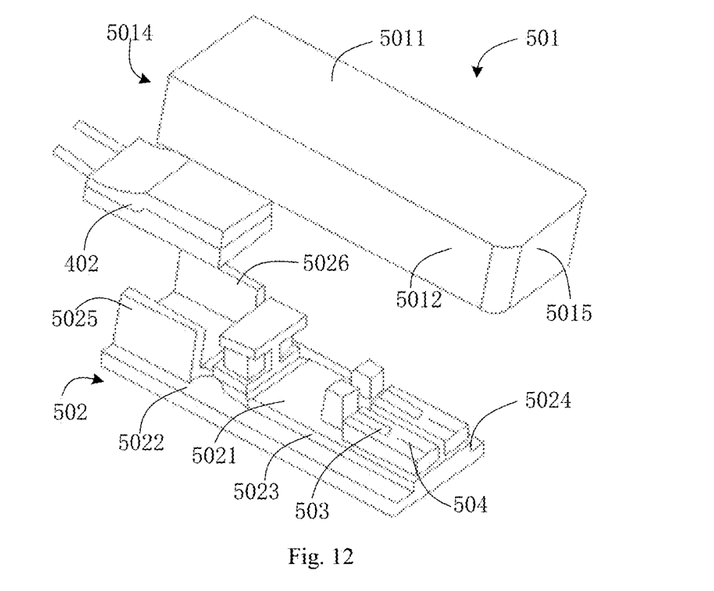
FIG. 12 is an exploded structural diagram illustrating a second laser box according to an embodiment of the present disclosure.

FIG. 12 is an exploded structural diagram illustrating a second laser box according to an embodiment of the present disclosure. As shown in FIG. 12, same as the first laser box provided in the embodiments of the present disclosure, the laser box 500 provided in this embodiment of the present disclosure also includes an upper cover 501, a flat base 502, and a laser assembly.

Figure 13:
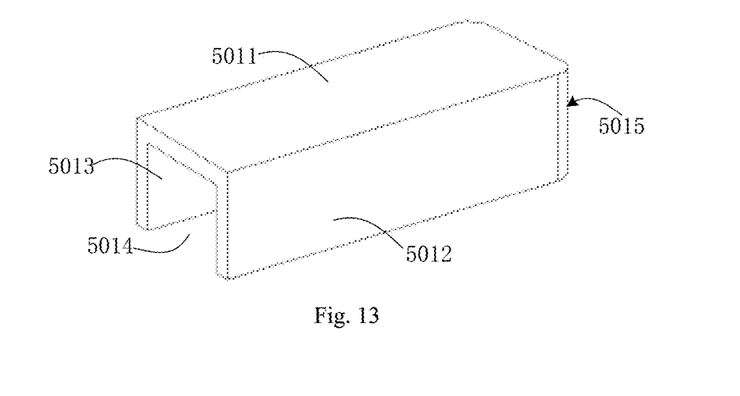
FIG. 13 is a schematic structural diagram illustrating an upper cover of a second laser box according to an embodiment of the present disclosure.

FIG. 13 is a schematic structural diagram illustrating an upper cover of a second laser box according to an embodiment of the present disclosure. As shown in FIG. 12 and FIG. 13, different from the first laser box provided in the embodiments of the present disclosure, the upper cover 501 provided in this embodiment of the present disclosure further includes a third side plate 5015. A top portion of the third side plate 5015 is connected to a side in a width direction of the top plate 5011. Moreover, the third side plate 5015 is connected to the first side plate 5012 and the second side plate 5013, and is located at a right end of the upper cover 501. As shown in FIG. 13, a bottom portion of the third side plate 5015 is flush with the bottom portion of the first side plate 5012 and the bottom portion of the second side plate 5013. In this embodiment of the present disclosure, the bottom portion of the third side plate 5015 may be flush with the bottom portion of the first side plate 5012 and the bottom portion of the second side plate 5013, but is not limited to being flush therewith; instead, it may also not be flush with the bottom portion of the first side plate 5012 and the bottom portion of the second side plate 5013. For example, the third side plate 5015, together with the first side plate 5012 and the second side plate 5013, may form a second notch at the right end of the upper cover 501.

The flat base 502 provided in this embodiment of the present disclosure further includes a first baffle 5025 and a second baffle 5026, where the first baffle 5025 and the second baffle 5026 are disposed at a left end of the flat base 502. The distance (inner width) between the first baffle 5025 and the second baffle 5026 are precisely matched with a width of the fiber interface 402, thereby reducing an assembly inaccuracy, and thus improving coupling efficiency of the light from the laser box 500 to the optical fibers in the second fiber ribbon. The first baffle 5025 and the second baffle 5026 are configured to limit and fix the fiber interface 402, and may be further configured to limit and fix the upper cover 501 when the upper cover 501 is closed over the base 502. The flat base 502 in the first laser box provided in the embodiments of the present disclosure may also be provided with a first baffle and a second baffle.

Figure 14:
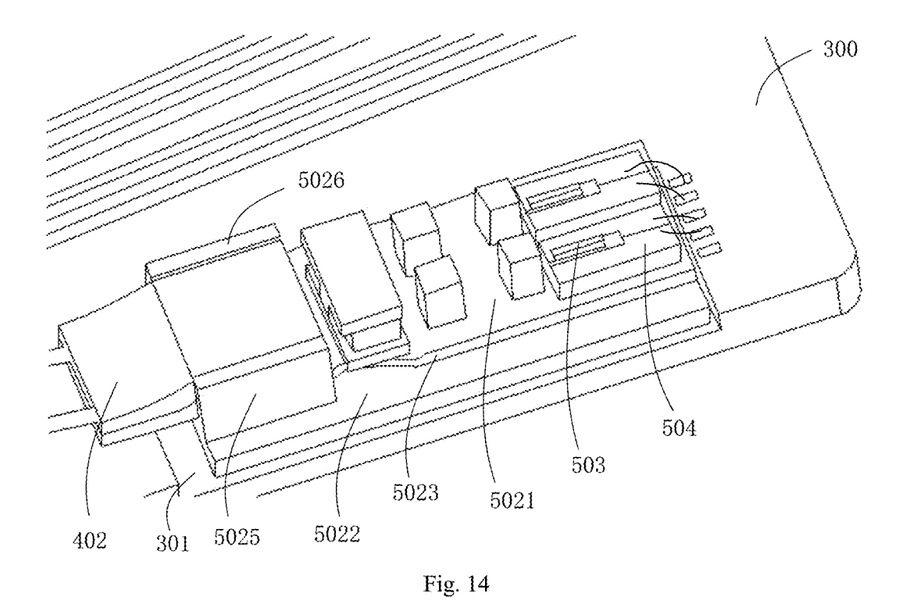
FIG. 14 is a first diagram illustrating assembly of a second laser box according to an embodiment of the present disclosure.

FIG. 14 is a first diagram illustrating assembly of a second laser box according to an embodiment of the present disclosure. As shown in FIG. 14, the flat base 502 is disposed in the recess 301, the fiber interface 402 is fixed between the first baffle 5025 and the second baffle 5026, and the conductive substrate 504 carrying the laser chip 503 is disposed on the first plane 5021 of the flat base 502. In an embodiment of the present disclosure, the conductive substrate 504 is entirely located on the first plane 5021 of the flat base 502. As shown in FIG. 14, the conductive substrate 504 is connected to the circuit board 300 via bonding wires. However, in this embodiment, the conductive substrate 504 may alternatively be electrically connected to the circuit board 300 via a flexible circuit board.

Figure 15:
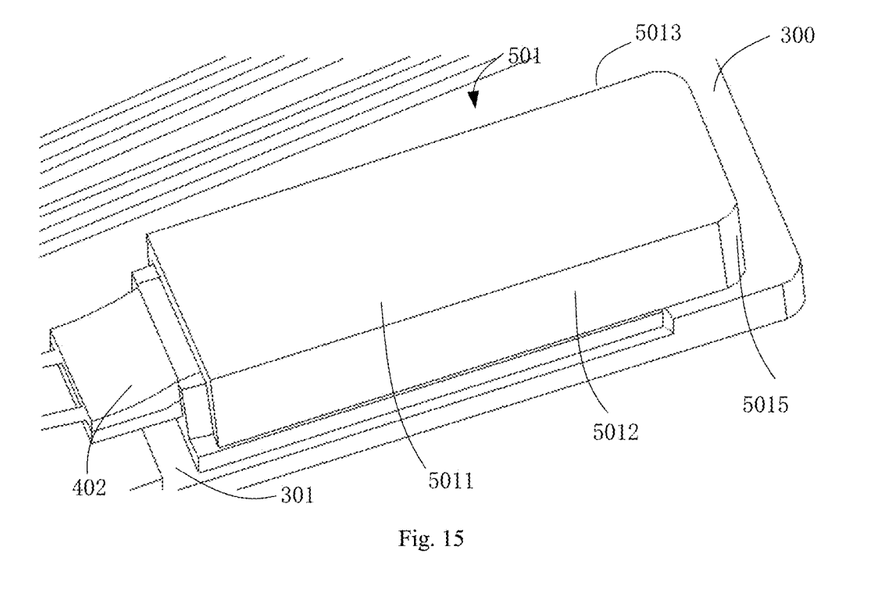
FIG. 15 is a second diagram illustrating assembly of a second laser box according to an embodiment of the present disclosure.

FIG. 15 is a second diagram illustrating assembly of a second laser box according to an embodiment of the present disclosure. As shown in FIG. 15, the upper cover 501 may further cap and/or be covered on the circuit board 300. The upper cover 501 caps the laser assembly as well as the bonding wires between the conductive substrate 504 and the circuit board 300, so that the connection between the conductive substrate 504 and the circuit board 300 may be protected.

In an embodiment of the present disclosure, when the flat base 502 is disposed in the recess 301, the second plane 5022 is proximately aligned in height direction with the surface of the circuit board 300. In other words, the second plane 5022 is flush with the surface of the circuit board 300. Therefore, when the upper cover 501 is completely assembled, bottom surfaces of the first side plate 5012 and the second side plate 5013 are in contact with the second plane 5022, and are further in contact with the circuit board 300. If the conductive substrate 504 is connected to the circuit board 300 via bonding wires, the upper cover 501 encloses/caps the laser assembly as well as the bonding wires between the conductive substrate 504 and the circuit board 300 in a cavity formed by the upper cover 501, the flat base 502, and the circuit board 300. In this case, in addition to enclosing/capping the laser assembly, the upper cover 501 may also protect the bonding wires between the conductive substrate 504 and the circuit board 300, thereby preventing the bonding wires between the conductive substrate 504 and the circuit board 300 from being damaged or polluted by foreign objects, and meanwhile, preventing water vapor from entering into an inner space of the laser box 500 to a certain extent.

Figure 16:
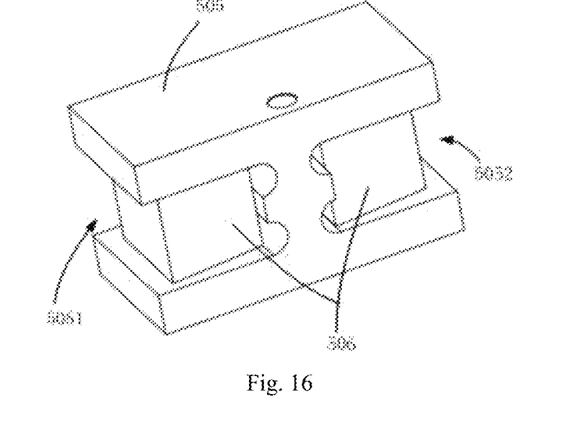
FIG. 16 is a schematic structural diagram illustrating an isolator according to an embodiment of the present disclosure.

To facilitate mounting of the isolator and ensure mounting accuracy of the isolator in the optical path of the laser chip, the isolator in the laser assembly provided in the embodiments of the present disclosure includes an I-shaped magnet and an optical isolating component. FIG. 16 is a schematic structural diagram illustrating an isolator according to an embodiment of the present disclosure. As shown in FIG. 16, the isolator includes an I-shaped magnet 505 and optical isolating components 506, where the I-shaped magnet 505 is provided with a first slot 5051 and a second slot 5052. The first slot 5051 and the second slot 5052 are respectively configured for receiving the optical isolating components 506. The I-shaped magnet 505 facilitates mounting of the optical isolating component 506, and meanwhile helps to reduce an assembly error between two optical isolating components arranged side by side, thereby ensuing space consistency between the two optical isolating components.

With reference to the foregoing embodiments, it may be learned that the flat base provided in the embodiments of the present disclosure has a "丌" structure; laser assembly components such as the laser chip and the conductive substrate are all disposed on the first plane of the flat base, and the upper cover caps/is covered on the flat base so as to enclose the laser assembly within the cavity formed by the upper cover and the flat base. When the upper cover caps/is covered on the flat base by using glue, curing stress of the glue is not sufficient to make the first plane of the flat base deform. In this case, the laser chip, the conductive substrate, and other laser components will not shift; by this, stability and reliability of optical performance of the laser box may be ensured. Meanwhile, during the process of fixing the upper cover and the flat base, since a glue dispensing area is relatively low, glue may be first dispensed onto the second plane of the flat base, and the upper cover may be arranged/capped thereon afterwards, which makes the assembly easier.

Figure 17:
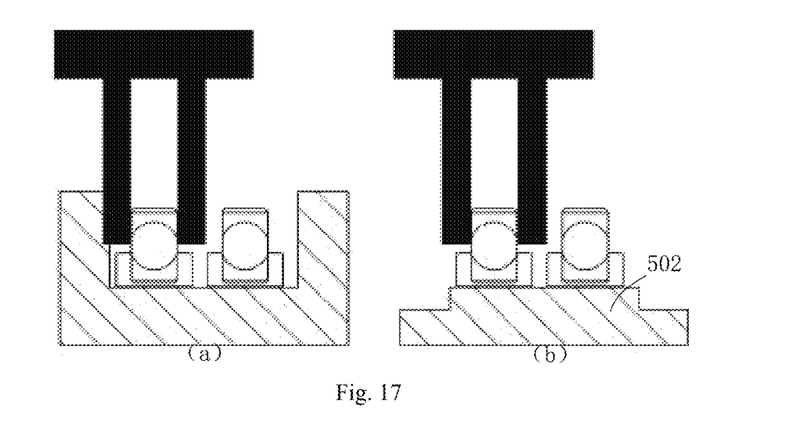
FIG. 17 is a schematic structural diagram illustrating assembly of a laser assembly.

In addition, FIG. 17(a) is a schematic structural diagram illustrating assembly of a laser assembly according to the related art, and FIG. 17(b) is a schematic structural diagram illustrating assembly structure of a laser assembly according to an embodiment of the present disclosure. As shown in FIG. 17, a base structure in the related art is likely to interfere with a clamping tool, which makes it not easy to assemble the laser assembly by using the clamping tool. On the other hand, the flat base 502 in the embodiments of the present disclosure provides a sufficient operation space, and the laser assembly may be easily assembled by using a clamping tool. Therefore, the structure of the flat base 502 provided in the embodiments of the present disclosure helps to improve assembly efficiency and assembly accuracy of the laser assembly.

Finally, it should be noted that the foregoing embodiments are merely intended to describe some of the technical solutions of the present disclosure, and shall not be construed as limitations. Although the present disclosure is described in detail with reference to the foregoing embodiments, one of ordinary skill in the art may understand that modifications still may be made to the technical solutions disclosed in the foregoing embodiments, or equivalent replacements may be made to some of the technical features. However, these modifications or equivalent replacements do not deviate the nature of corresponding technique solutions from the spirit and scope of the technique solutions of the embodiments of the present disclosure.

What is claimed is:

1. An optical module, comprising:
   a circuit board provided with a recess;
   a laser box disposed in the recess and electrically connected to the circuit board, for emitting light without carrying a signal;
   a fiber ribbon, wherein one end of the fiber ribbon is connected to the laser box for transmitting the light without carrying a signal; and
   a silicon photonic chip electrically connected to the circuit board and to the other end of the fiber ribbon, for receiving the light without carrying a signal transmitted by the fiber ribbon,
   wherein the laser box comprises:
      a flat base disposed in the recess, wherein one end of the flat base is coupled to the fiber ribbon;
      a conductive substrate disposed at the other end of the flat base and electrically connected to the circuit board;
      a laser chip attached on the conductive substrate and electrically connected to the conductive substrate; and
      an upper cover comprising a top plate and side plates connected to the top plate, wherein bottom portions of the side plates are connected to the flat base, so that the upper cover caps the flat base.

2. The optical module according to claim 1, wherein the flat base is provided with a first plane and a second plane, and the conductive substrate is disposed on the first plane; and
   the first plane and the second plane form a first step surface and a second step surface along a length direction of the flat base, and the bottom portions of the side plates are respectively connected the first step surface and the second step surface to form a bayonet coupling.

3. The optical module according to claim 1, wherein a first baffle and a second baffle are further disposed on the flat base; and
   the fiber ribbon is provided with a fiber interface that is limited and fixed by the first baffle and the second baffle.

4. The optical module according to claim 1, wherein the side plates comprise a first side plate and a second side plate; wherein
   the first side plate and the second side plate are disposed along a length direction of the top plate, respectively; and
   a first notch is formed at a left end of the upper cover by the top plate, the first side plate, and the second side plate, wherein one end of the fiber ribbon passes through the first notch.

5. The optical module according to claim 4, wherein a second notch is formed at a right end of the upper cover by the first side plate and the second side plate; wherein the laser chip is arranged on one end of the conductive substrate, with another end of the conductive substrate protruding outwardly from the second notch.

6. The optical module according to claim 4, wherein the side plates further comprise a third side plate; and
   the third side plate is disposed at a right end of the top plate along a direction perpendicular to the length direction of the top plate, and is connected to the first side plate and the second side plate.

7. The optical module according to claim 6, wherein the conductive substrate is connected to the circuit board via bonding wires; and the upper cover further caps the circuit board, so that the conductive substrate and the bonding wires between the circuit board and the conductive substrate are covered by the upper cover.

8. The optical module according to claim 6, wherein the flat base is provided with a first plane and a second plane, and the conductive substrate is disposed on the first plane; and wherein a bottom portion of the first side plate, a bottom portion of the second side plate, and a bottom portion of the third side plate are flush with each other; and the second plane is flush with a surface of the circuit board.

9. The optical module according to claim 1, wherein the laser box further comprises an isolator, the isolator comprises an I-shaped magnet and optical isolating components, the I-shaped magnet is provided with a first slot and a second slot configured for receiving the optical isolating components, and the I-shaped magnet is disposed on the flat base.

10. The optical module according to claim 3, wherein the fiber interface comprises an upper substrate and a lower substrate, a groove is formed on a surface of the lower substrate, an optical fiber of the fiber ribbon is disposed in the groove, and the lower substrate and the optical fiber are pressed and covered by the upper substrate.

\* \* \* \* \*